United States Patent Office 3,121,016
Patented Feb. 11, 1964

3,121,016
CORROSION RESISTANT COATING FOR METALS
Dana M. Forinash and Robert F. McKibben, Dayton, Ohio, assignors to The National Cash Register Company, Dayton, Ohio, a corporation of Maryland
No Drawing. Filed June 9, 1958, Ser. No. 740,567
2 Claims. (Cl. 106—14)

This invention relates to a water-displacing corrosion-resistant coating applicable to metal surfaces, and more particularly pertains to such in which the metal is protected from the atmosphere, including its moisture content, and in addition displaces water which may be on said metal surfaces at the time of application.

The coating can be applied to metal surfaces without dilution, or dispersed in a liquid vehicle, but, preferably, is applied as a solution or dispersion in an evaporable or volatile vehicle, for purposes of convenience and making a uniform application. The coating material is particularly suitable for application to small machine parts, either individually or in an assembly thereof, in the latter case the coating being more easily applied as a spray or a dip.

In an example of the invention, the coating consists of, in parts by weight—

| | Parts |
|---|---|
| Petroleum sodium sulfonate having a molecular weight of 400–550 | 8–12 |
| Oleoyl N-methyl glycine | 3–10 |
| Petroleum oil having a viscosity of 100–750 Saybolt Universal seconds at 100 degrees Fahrenheit | 78–89 |

The above formulation at room temperature (approximately 70 degrees Fahrenheit) is a relatively thin liquid, which, without any vehicle being added, may be applied by brushing, spraying, or other equivalent means to the parts being treated. The most effective use of this material is on ferrous metal parts, but it is also useful in preventing corrosion on other metals such as zinc, copper, brass, aluminum, and similar structural materials.

Effective diluents are evaporable petroleum fractions (boiling between 300 degrees and 500 degrees Fahrenheit), and aromatic solvents such as tetralin, diethyl benzene, and equivalents.

What is claimed is:

1. A water-displacing, corrosion-resistant coating applicable to metal surface affected by the atmosphere, including moisture, consisting of, in parts by weight—

| | Parts |
|---|---|
| Petroleum sodium sulfonate having a molecular weight of 400–550 | 8–12 |
| Oleoyl N-methyl glycine | 3–10 |
| Petroleum oil having a viscosity of 100–750 Saybolt Universal seconds at 100 degrees Fahrenheit | 78–89 |

2. The composition of claim 1 diluted in a rapidly-evaporating solvent vehicle.

References Cited in the file of this patent
UNITED STATES PATENTS

| 2,677,618 | Dieman et al. | May 4, 1954 |
| 2,790,779 | Spivack et al. | Apr. 30, 1957 |